United States Patent
Gutman et al.

(10) Patent No.: US 11,206,073 B2
(45) Date of Patent: Dec. 21, 2021

(54) SYNCHRONIZATION OF BASE STATION BEAM SWITCHING WITH CHANNEL FEEDBACK

(71) Applicant: QUALCOMM Incorporated, San Diego, CA (US)

(72) Inventors: Igor Gutman, Ramat Gan (IL); Michael Levitsky, Rehovot (IL); Ran Berliner, Kfar-Aviv (IL); Shay Landis, Hod Hasharon (IL); Gideon Shlomo Kutz, Ramat Hasharon (IL)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/678,740

(22) Filed: Nov. 8, 2019

(65) Prior Publication Data
US 2021/0143888 A1 May 13, 2021

(51) Int. Cl.
*H04B 7/06* (2006.01)
*H04L 5/00* (2006.01)
*H04W 56/00* (2009.01)
*H04W 72/04* (2009.01)

(52) U.S. Cl.
CPC ......... *H04B 7/0695* (2013.01); *H04B 7/0626* (2013.01); *H04L 5/0048* (2013.01); *H04W 56/0005* (2013.01); *H04W 72/042* (2013.01); *H04W 72/046* (2013.01); *H04W 72/0446* (2013.01)

(58) Field of Classification Search
CPC .. H04B 7/0413; H04B 7/0617; H04B 7/0456; H04B 7/4017; H04B 7/0639
USPC ....................................................... 375/267
See application file for complete search history.

(56) References Cited

U.S. PATENT DOCUMENTS

| 2010/0195527 | A1* | 8/2010 | Gorokhov | H04B 7/0417 370/252 |
| 2013/0273954 | A1* | 10/2013 | Ji | H04L 5/0057 455/509 |
| 2013/0315321 | A1* | 11/2013 | Rajagopal | H04L 27/261 375/260 |
| 2014/0314167 | A1* | 10/2014 | Jeong | H04B 7/0626 375/267 |
| 2016/0308365 | A1 | 10/2016 | Mayer et al. | |
| 2017/0188252 | A1* | 6/2017 | Miao | H04L 5/0048 |

(Continued)

FOREIGN PATENT DOCUMENTS

EP 3253116 A1 12/2017

OTHER PUBLICATIONS

5G NR Terminologies—Subcarrier Spacing, Fram-Subframe, Slot and Symbol, Jul. 10, 2018,Techplayon,http://www.techplayon.com/understanding-basic-5g-nr-terminologies-subcarrier-spacing-frame-and-subrrame-slot-and-ofdm-symbols/ (Year: 2018).*

(Continued)

*Primary Examiner* — Shuwang Liu
*Assistant Examiner* — Gina M McKie
(74) *Attorney, Agent, or Firm* — Harrity & Harrity, LLP (57) ABSTRACT

Various aspects of the present disclosure generally relate to wireless communication. In some aspects, a base station may synchronize a beam switch of the base station with transmission of a reference signal for channel state feedback, and schedule a channel state feedback report to be transmitted after the transmission of the reference signal for channel state feedback. Numerous other aspects are provided.

30 Claims, 6 Drawing Sheets

(56) References Cited

U.S. PATENT DOCUMENTS

| | | | |
|---|---|---|---|
| 2017/0265111 A1* | 9/2017 | Fan .................. | H04B 7/0408 |
| 2017/0346534 A1* | 11/2017 | Islam ................ | H01Q 1/245 |
| 2018/0110066 A1* | 4/2018 | Luo .................. | H04W 72/0413 |
| 2018/0152232 A1* | 5/2018 | Cedergren .......... | H04B 7/0695 |
| 2018/0269947 A1* | 9/2018 | Levitsky ............ | H04B 7/0695 |
| 2019/0052331 A1* | 2/2019 | Chang ............... | H04B 7/0617 |
| 2019/0222279 A1* | 7/2019 | Xi .................... | H04W 72/00 |
| 2019/0260458 A1* | 8/2019 | Zhou ................. | H04B 7/0626 |
| 2019/0313389 A1* | 10/2019 | Wilson .............. | H04B 7/088 |
| 2019/0319649 A1* | 10/2019 | Malik ................ | H04B 7/043 |
| 2020/0099437 A1* | 3/2020 | Harada .............. | H04W 76/19 |
| 2020/0119790 A1* | 4/2020 | Rao .................. | H04B 7/0617 |

OTHER PUBLICATIONS

International Search Report and Written Opinion—PCT/US2019/061427—ISAEPO—dated Jun. 22, 2020.

* cited by examiner

SYNCHRONIZATION OF BASE STATION BEAM SWITCHING WITH CHANNEL FEEDBACK

TECHNICAL FIELD

Aspects of the technology described below generally relate to wireless communication and to techniques and apparatuses for synchronization of base station beam switching with channel feedback. Some techniques and apparatuses described herein enable and provide wireless communication devices and systems configured for increased data rates, capacity, spectral efficiency, and reliability.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a new radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

Some wireless communication systems, such as systems using millimeter wave (mmW) technology, may use beamforming for communications between a UE and a base station. For example, the base station and the UE may each generate beams for transmission or reception of communications between the UE and the base station. The base station may select beams based at least in part on information received from the UE, such as a reference signal received power (RSRP) report. The RSRP report may be based at least in part on a synchronization signal block transmitted by the base station or a channel state information (CSI) reference signal (RS) transmitted by the base station. In some aspects, the base station may perform link adaption (LA) based at least in part on a channel state feedback (CSF) received from the UE (e.g., to adjust rank, modulation and coding scheme (MCS), precoding configuration, and/or the like). In some aspects, the base station may perform LA based at least in part on a cyclic redundancy check, which may be used for converging MCS, rank, and/or the like.

In some aspects, the base station may switch a beam, such as a transmit beam or a receive beam. In such a case, the base station may perform LA to adjust rank, MCS, and precoding, thereby improving spectral efficiency after the beam switch. For example, the target beam of the beam switch (e.g., the beam to which the base station switches, as compared to the source beam from which the base station switches to the target beam) may be associated with bad channel conditions. If the target beam is associated with bad channel conditions, the base station may not be able to perform LA until CSF is received after the base station transmits a reference signal. In this case, the base station may experience subpar performance until the LA is performed.

Some techniques and apparatuses described herein provide synchronization of a base station's beam switch with transmission of a reference signal (e.g., a reference signal for channel state feedback and/or the like) and/or scheduling of a CSF transmission by the UE. Various approaches for the synchronization, such as time-based approaches, resource-proximity-based approaches, and slot-based approaches are described herein. The synchronization of the beam switch with transmission of the reference signal and/or scheduling of the CSF transmission may reduce a length of time for LA convergence after a beam switch. Reducing the length of time for LA convergence after the beam switch may improve performance of systems that use beamforming, such as mmW systems.

In some aspects, a method of wireless communication, performed by a base station, may include synchronizing a beam switch of the base station with transmission of a reference signal for channel state feedback; and scheduling a channel state feedback report to be transmitted after the transmission of the reference signal for channel state feedback.

In some aspects, a base station for wireless communication may include memory and one or more processors operatively coupled to the memory. The memory and the one or more processors may be configured to synchronize a beam switch of the base station with transmission of a reference signal for channel state feedback; and schedule a channel state feedback report to be transmitted after the transmission of the reference signal for channel state feedback.

In some aspects, a non-transitory computer-readable medium may store one or more instructions for wireless communication. The one or more instructions, when executed by one or more processors of a base station, may cause the one or more processors to synchronize a beam switch of the base station with transmission of a reference signal for channel state feedback; and schedule a channel state feedback report to be transmitted after the transmission of the reference signal for channel state feedback.

In some aspects, an apparatus for wireless communication may include means for synchronizing a beam switch of the apparatus with transmission of a reference signal for channel state feedback; and means for scheduling a channel state feedback report to be transmitted after the transmission of the reference signal for channel state feedback.

In some aspects, a method of wireless communication, performed by a UE, may include receiving a reference signal for channel state feedback that is synchronized with a beam switch of a base station; and transmitting a channel state feedback report within a threshold time window of receiving of the reference signal for channel state feedback.

In some aspects, a UE for wireless communication may include memory and one or more processors operatively coupled to the memory. The memory and the one or more processors may be configured to receive a reference signal for channel state feedback that is synchronized with a beam switch of a base station; and transmit a channel state feedback report within a threshold time window of receiving of the reference signal for channel state feedback.

In some aspects, a non-transitory computer-readable medium may store one or more instructions for wireless communication. The one or more instructions, when executed by one or more processors of a UE, may cause the one or more processors to receive a reference signal for channel state feedback that is synchronized with a beam switch of a base station; and transmit a channel state feedback report within a threshold time window of receiving of the reference signal for channel state feedback.

In some aspects, an apparatus for wireless communication may include means for receiving a reference signal for channel state feedback that is synchronized with a beam switch of a base station; and means for transmitting a channel state feedback report within a threshold time window of receiving of the reference signal for channel state feedback.

In some aspects, a method of wireless communication, performed by a base station, may include transmitting a reference signal for channel state feedback in synchronization with a beam switch of the base station; and scheduling a channel state feedback report to be transmitted after the transmission of the reference signal for channel state feedback.

In some aspects, a base station for wireless communication may include memory and one or more processors operatively coupled to the memory. The memory and the one or more processors may be configured to transmit a reference signal for channel state feedback in synchronization with a beam switch of the base station; and schedule a channel state feedback report to be transmitted after the transmission of the reference signal for channel state feedback.

In some aspects, a non-transitory computer-readable medium may store one or more instructions for wireless communication. The one or more instructions, when executed by one or more processors of a base station, may cause the one or more processors to transmit a reference signal for channel state feedback in synchronization with a beam switch of the base station; and schedule a channel state feedback report to be transmitted after the transmission of the reference signal for channel state feedback.

In some aspects, an apparatus for wireless communication may include means for transmitting a reference signal for channel state feedback in synchronization with a beam switch of the apparatus; and means for scheduling a channel state feedback report to be transmitted after the transmission of the reference signal for channel state feedback.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency (RF) chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

Figure 1:
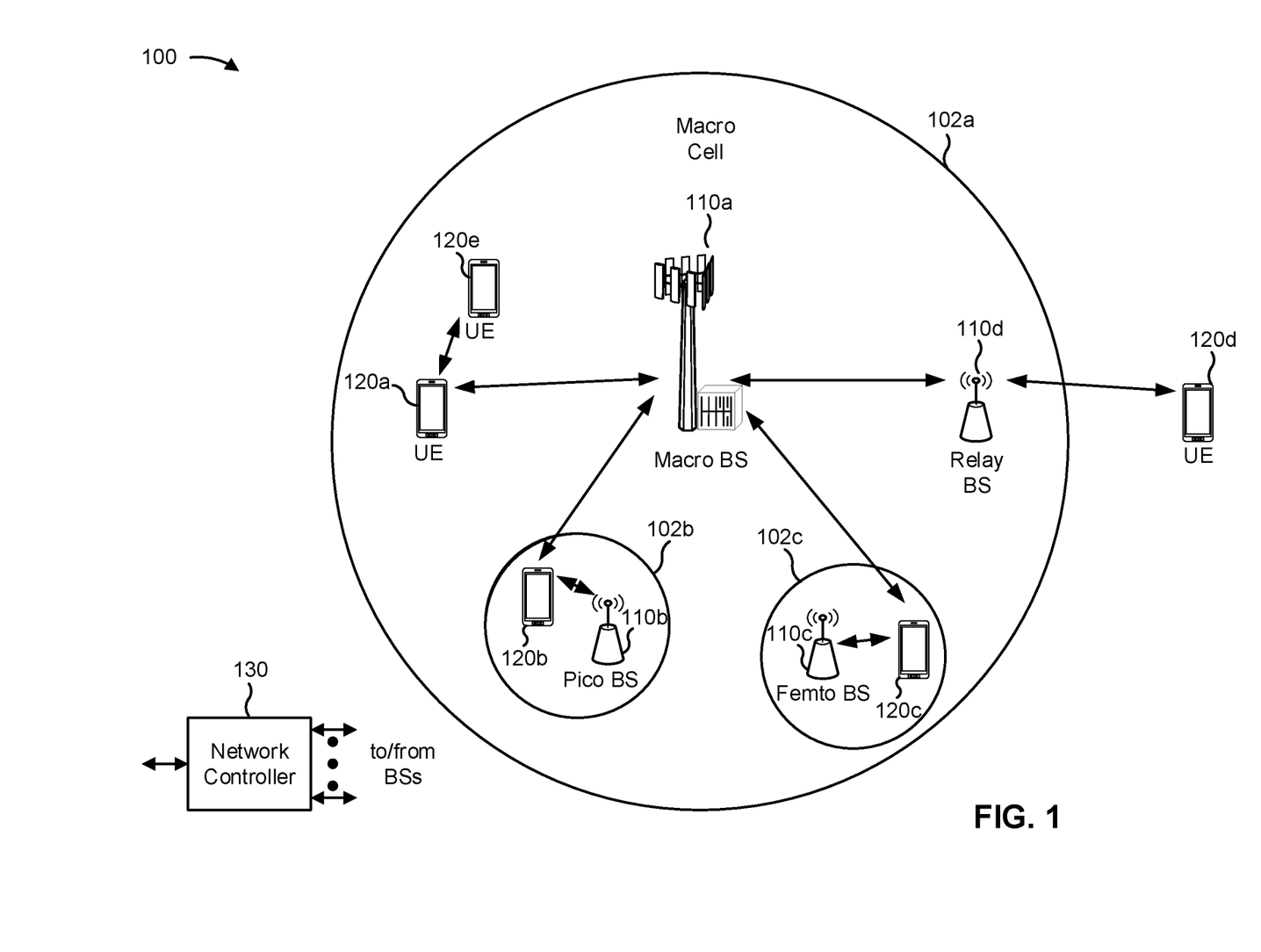
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
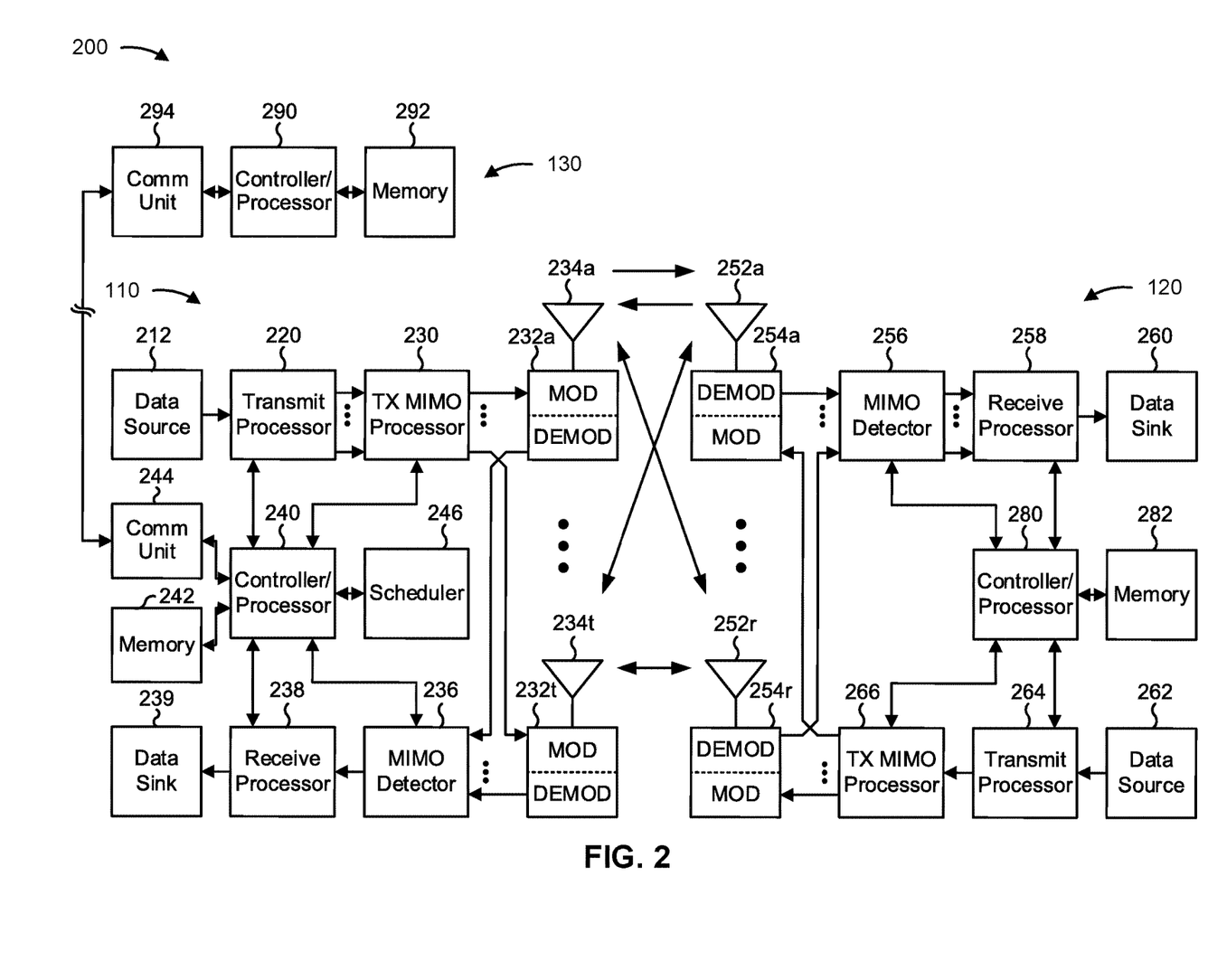
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink RF signals. The downlink RF signals may be received from and/or may be transmitted by one or more base stations 110. The signals can be provided to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with synchronization of base station beam switching with channel feedback, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of means or components for implementing communication functions. For example, the variety of means may include means for receiving a reference signal for channel state feedback that is synchronized with a beam switch of a base station, means for transmitting a channel state feedback report within a threshold time window of receiving of the reference signal for channel state feedback, and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, the base station 110 may include a variety of means or components for implementing communication functions. For example, the variety of means may include means for synchronizing a beam switch of the base station with transmission of a reference signal for channel state feedback, means for scheduling a channel state feedback report to be transmitted after the transmission of the reference signal for channel state feedback, means for scheduling the reference signal for channel state feedback within a threshold number of slots of the beam switch of the base station, means for scheduling the reference signal for channel state feedback within a time window of the beam switch of the base station, means for scheduling the reference signal for channel state feedback in a next available resource after the beam switch, means for scheduling the reference signal for channel state feedback in a same slot as or a next slot after the beam switch of the base station, means for scheduling the channel state feedback report to be transmitted in a next available resource after the transmission of the reference signal for channel state feedback, means for scheduling the channel state feedback report to be transmitted within a time window after the transmission of the reference signal for channel state feedback, and/or the like.

In some aspects, the base station 110 may include a variety of structural components for carrying out functions of the various means. For example, structural components that carry out functions of such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3:
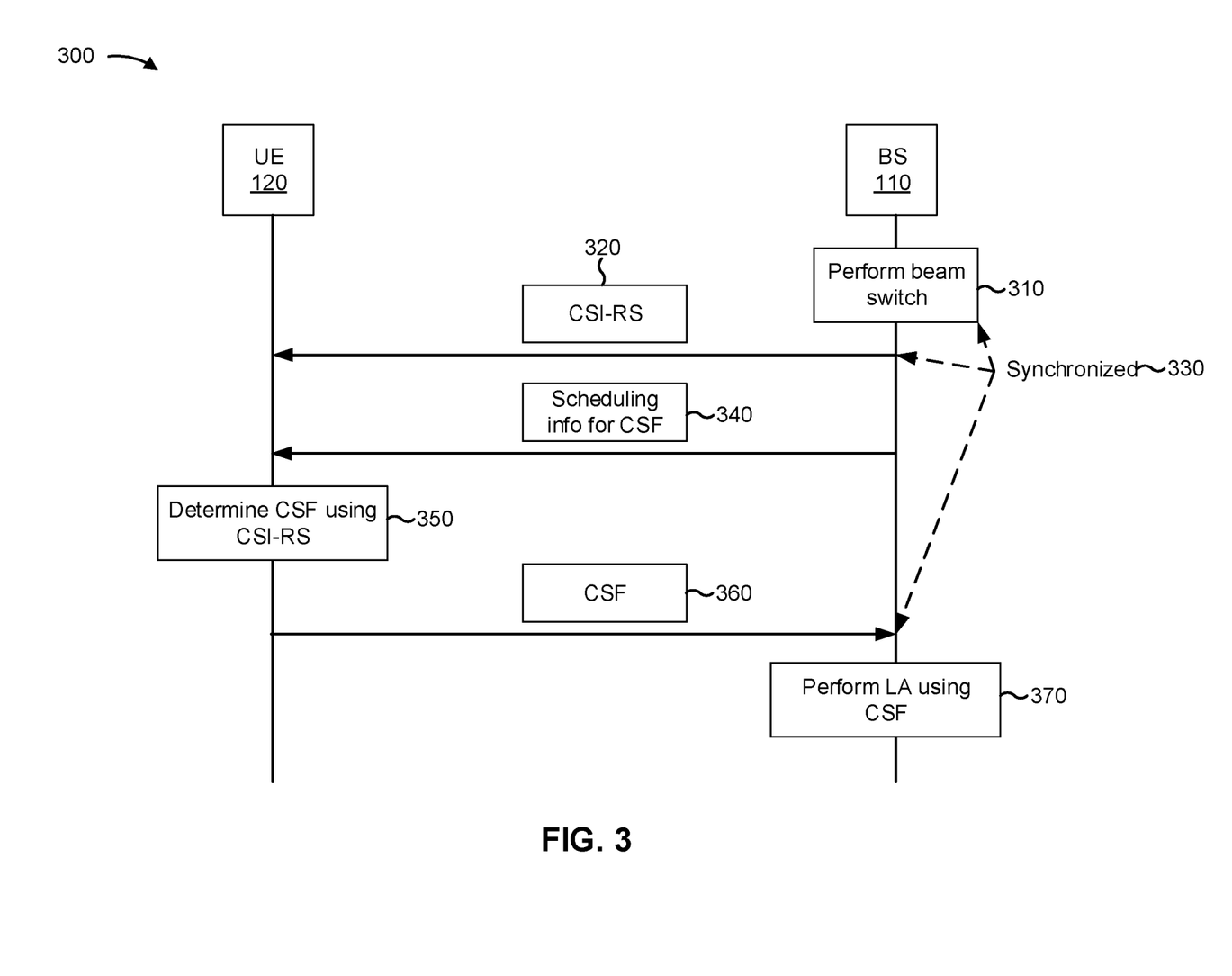
FIG. 3 is a diagram illustrating an example of synchronization of a beam switch with a reference signal and/or channel state feedback, in accordance with various aspects of the present disclosure.

FIG. 3 is a diagram illustrating an example 300 of synchronization of a beam switch with a reference signal and/or channel state feedback, in accordance with various aspects of the present disclosure. As shown, example 300 includes a UE 120 and a BS 110. In some aspects, UE 120 and BS 110 may communicate using beamforming, such as a mmW beamforming technique or another technique involving link adaptation (LA).

As shown in FIG. 3, and by reference number 310, the BS 110 may perform a beam switch from a source set of beams to a target set of beams. For example, the BS 110 may switch from a source transmit beam to a target transmit beam, from a source set of transmit beams to a target set of transmit beams, from a source receive beam to a target receive beam, from a source set of receive beams to a target set of receive beams, and/or the like. The BS 110 may perform LA to improve performance of the target set of beams. However, a delay between the beam switch, a reference signal for channel state feedback, and/or channel state feedback by the UE may delay the LA. Delaying LA after the beam switch may degrade performance of the target set of beams until LA is performed.

As shown by reference number 320, the BS 110 may transmit a reference signal for CSF. Here, the reference signal is a CSI-RS. The reference signal may include any reference signal used for channel state feedback, such as a synchronization signal block and/or the like. In some aspects, the BS 110 may transmit the reference signal for CSF on a particular resource, such as a configured resource for the reference signal and/or the like.

As shown by reference number 330, the beam switch may be synchronized with the reference signal for CSF and/or with CSF to be transmitted by the UE 120. For example, the beam switch may be synchronized with the reference signal and the CSF, or may be synchronized with only one of the reference signal and the CSF. As another example, the reference signal may be synchronized with the CSF.

In some aspects, the beam switch may be synchronized with the reference signal based at least in part on a time window associated with the beam switch. For example, the BS 110 may transmit the reference signal within the time window. The time window may be 1 millisecond (ms) in length, 2 ms in length, 5 ms in length, or may have a different length.

In some aspects, the beam switch may be synchronized with the reference signal based at least in part on a resource allocation of the reference signal. For example, the resource allocation of the reference signal may be a next available resource allocation after the beam switch. In some aspects, the beam switch may be synchronized with the reference signal using a slot-based technique. For example, the reference signal may be transmitted within N slots of the beam switch, where N=0 (e.g., beam switch and reference signal in the same slot), 1 (e.g., reference signal in the next slot after the beam switch), 2, 5, or a different value.

As shown by reference number 340, the BS 110 may provide scheduling information for CSF to be transmitted by the UE 120. For example, as shown by reference number 350, the UE 120 may determine CSF using the reference signal. As shown by reference number 360, the UE 120 may transmit the CSF using the scheduled resource. It should be noted that the scheduling information shown by reference number 340 may be transmitted before the beam switch or the CSI-RS. For example, the BS 110 may configure a resource allocation for the CSF, or may schedule the CSF before performing the beam switch. If the CSF is not synchronized with the beam switch, then the BS 110 may not be able to perform LA until the CSF is received. In some cases, there may be a significant time gap between the CSF and the beam switch when unsynchronized (e.g., several ms, tens of ms, and/or the like), which may negatively impact performance of the target set of beams. By synchronizing the CSF with the reference signal and/or the beam switch as described below, the BS 110 improves performance of the target set of beams and reduces delay before LA is performed.

In some aspects, the CSF may be synchronized with the reference signal or the beam switch based at least in part on a time window associated with the reference signal or the beam switch. For example, the BS 110 may schedule the CSF within the time window. The time window may be 1 ms in length, 2 ms in length, 5 ms in length, or may have a different length.

In some aspects, the CSF may be synchronized with the reference signal or the beam switch based at least in part on a resource allocation of the reference signal. For example, the resource allocation of the CSF may be a next available resource allocation after the beam switch or the reference signal. In some aspects, the CSF may be synchronized with the reference signal or the beam switch using a slot-based technique. For example, the CSF may be scheduled within N slots of the beam switch or the reference signal, where N=0 (e.g., CSF and beam switch or reference signal in the same slot), 1 (e.g., CSF in the next slot after the reference signal or the beam switch), 2, 5, or a different value.

As shown by reference number 370, the BS 110 may perform LA based at least in part on the CSF. For example, the BS 110 may receive the CSF, and may perform LA using the CSF. In this way, a time gap between a beam switch and CSF may be reduced, thereby reducing the length of the time window during which the BS 110 operates on the target set of beams without having performed LA. Thus, block error rate (BLER) may be reduced, particularly for a target set of beams that is associated with significantly lower spectral efficiency than a corresponding source beam.

As indicated above, FIG. 3 is provided as an example. Other examples may differ from what is described with respect to FIG. 3.

Figure 4:
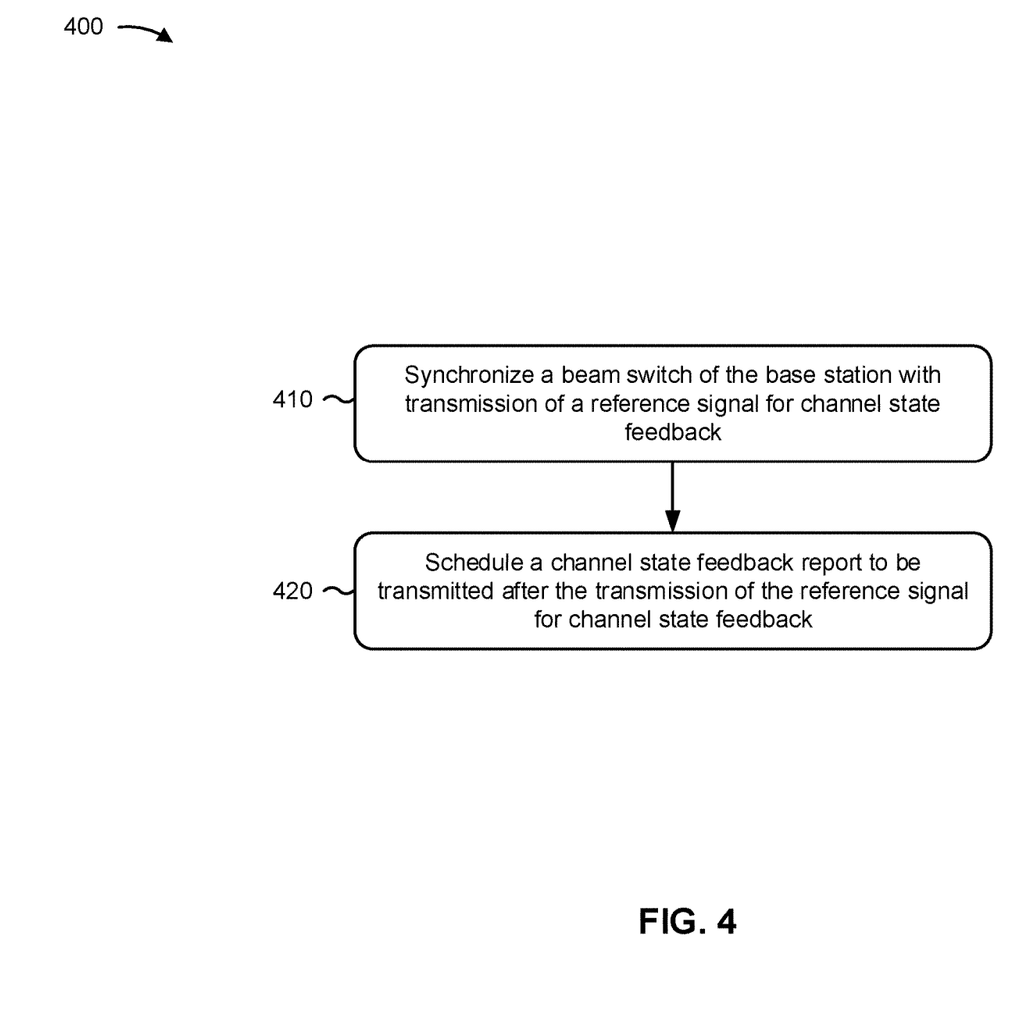
FIG. 4 is a diagram illustrating an example process performed, for example, by a base station, in accordance with various aspects of the present disclosure.

FIG. 4 is a diagram illustrating an example process 400 performed, for example, by a base station, in accordance with various aspects of the present disclosure. Example process 400 is an example where the base station (e.g., base station 110 and/or the like) performs operations associated with synchronization of base station beam switching with channel feedback.

As shown in FIG. 4, in some aspects, process 400 may include synchronizing a beam switch of the base station with transmission of a reference signal for channel state feedback (block 410). For example, the base station (e.g., using controller/processor 240, transmit processor 220, TX MIMO processor 230, MOD 232, antenna 234, and/or the like) may synchronize a beam switch of the base station with transmission of a reference signal for channel state feedback, as described above.

As further shown in FIG. 4, in some aspects, process 400 may include scheduling a channel state feedback report to be transmitted after the transmission of the reference signal for channel state feedback (block 420). For example, the base station (e.g., using controller/processor 240, transmit processor 220, TX MIMO processor 230, MOD 232, antenna 234, and/or the like) may schedule a channel state feedback report to be transmitted after the transmission of the reference signal for channel state feedback, as described above. It should be noted that scheduling the CSF report can be performed before the beam switch or after the beam switch.

Process 400 may include additional aspects, such as any single aspect or any combination of aspects described below and/or in connection with one or more other processes described elsewhere herein.

In a first aspect, synchronizing the beam switch of the base station with transmission of the reference signal for channel state feedback further comprises scheduling the reference signal for channel state feedback within a threshold number of slots of the beam switch of the base station.

In a second aspect, alone or in combination with the first aspect, the threshold number of slots is 1 slot.

In a third aspect, alone or in combination with one or more of the first and second aspects, synchronizing the beam switch of the base station with transmission of the reference signal for channel state feedback further comprises scheduling the reference signal for channel state feedback within a time window of the beam switch of the base station.

In a fourth aspect, alone or in combination with one or more of the first through third aspects, the time window is 2 ms.

In a fifth aspect, alone or in combination with one or more of the first through fourth aspects, the time window is 5 ms.

In a sixth aspect, alone or in combination with one or more of the first through fifth aspects, synchronizing the beam switch of the base station with transmission of the reference signal for channel state feedback further comprises scheduling the reference signal for channel state feedback in a next available resource after the beam switch.

In a seventh aspect, alone or in combination with one or more of the first through sixth aspects, synchronizing the beam switch of the base station with transmission of the reference signal for channel state feedback further comprises scheduling the reference signal for channel state feedback in a same slot as, or a next slot after, the beam switch of the base station.

In an eighth aspect, alone or in combination with one or more of the first through seventh aspects, scheduling the channel state feedback report to be transmitted after the transmission of the reference signal for channel state feedback further comprises scheduling the channel state feedback report to be transmitted in a next available resource after the transmission of the reference signal for channel state feedback.

In a ninth aspect, alone or in combination with one or more of the first through eighth aspects, scheduling the channel state feedback report to be transmitted after the transmission of the reference signal for channel state feedback further comprises scheduling the channel state feedback report to be transmitted within a time window after the transmission of the reference signal for channel state feedback.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
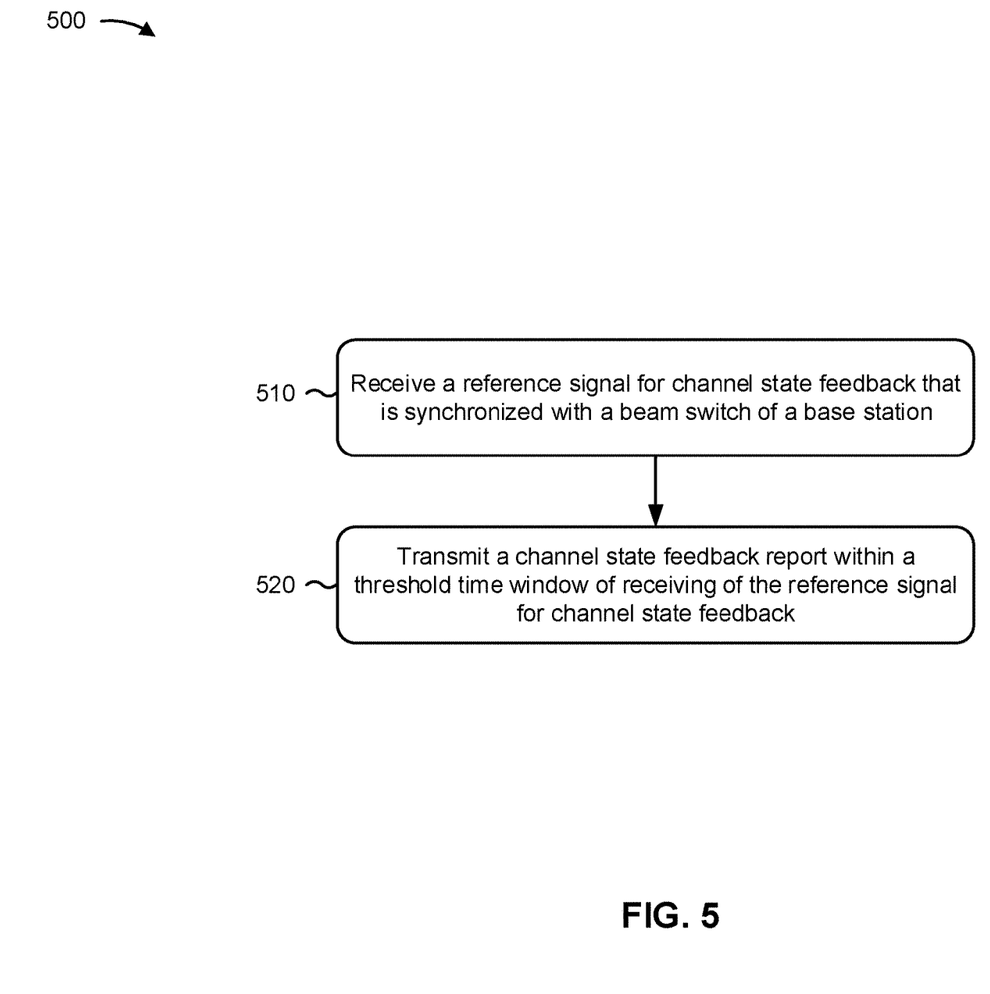
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with synchronization of base station beam switching with channel feedback.

As shown in FIG. 5, in some aspects, process 500 may include receiving a reference signal for channel state feedback that is synchronized with a beam switch of a base station (block 510). For example, the UE (e.g., using antenna 252, DEMOD 254, MIMO detector 256, receive processor 258, controller/processor 280, and/or the like) may receive a reference signal for channel state feedback that is synchronized with a beam switch of a base station, as described above.

As further shown in FIG. 5, in some aspects, process 500 may include transmitting a channel state feedback report within a threshold time window of receiving the reference signal for channel state feedback (block 520). For example, the UE (e.g., using controller/processor 280, transmit processor 264, TX MIMO processor 266, MOD 254, antenna 252, and/or the like) may transmit a channel state feedback report within a threshold time window of receiving of the reference signal for channel state feedback, as described above.

Process 500 may include additional aspects, such as any single aspect or any combination of aspects described below and/or in connection with one or more other processes described elsewhere herein.

In a first aspect, the reference signal for channel state feedback is received within a threshold number of slots of the beam switch of the base station.

In a second aspect, alone or in combination with the first aspect, the threshold number of slots is 1 slot.

In a third aspect, alone or in combination with one or more of the first and second aspects, the reference signal for channel state feedback is received within a time window of the beam switch of the base station.

In a fourth aspect, alone or in combination with one or more of the first through third aspects, the time window is 2 ms.

In a fifth aspect, alone or in combination with one or more of the first through fourth aspects, the time window is 5 ms.

In a sixth aspect, alone or in combination with one or more of the first through fifth aspects, the reference signal for channel state feedback is received within a time window of the beam switch of the base station.

In a seventh aspect, alone or in combination with one or more of the first through sixth aspects, the reference signal for channel state feedback is received in a same slot as, or a next slot after, the beam switch of the base station.

In an eighth aspect, alone or in combination with one or more of the first through seventh aspects, the channel state feedback report is transmitted in a next available resource after the transmission of the reference signal for channel state feedback.

In a ninth aspect, alone or in combination with one or more of the first through eighth aspects, the channel state feedback report is transmitted within a time window after the reference signal for channel state feedback is received.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
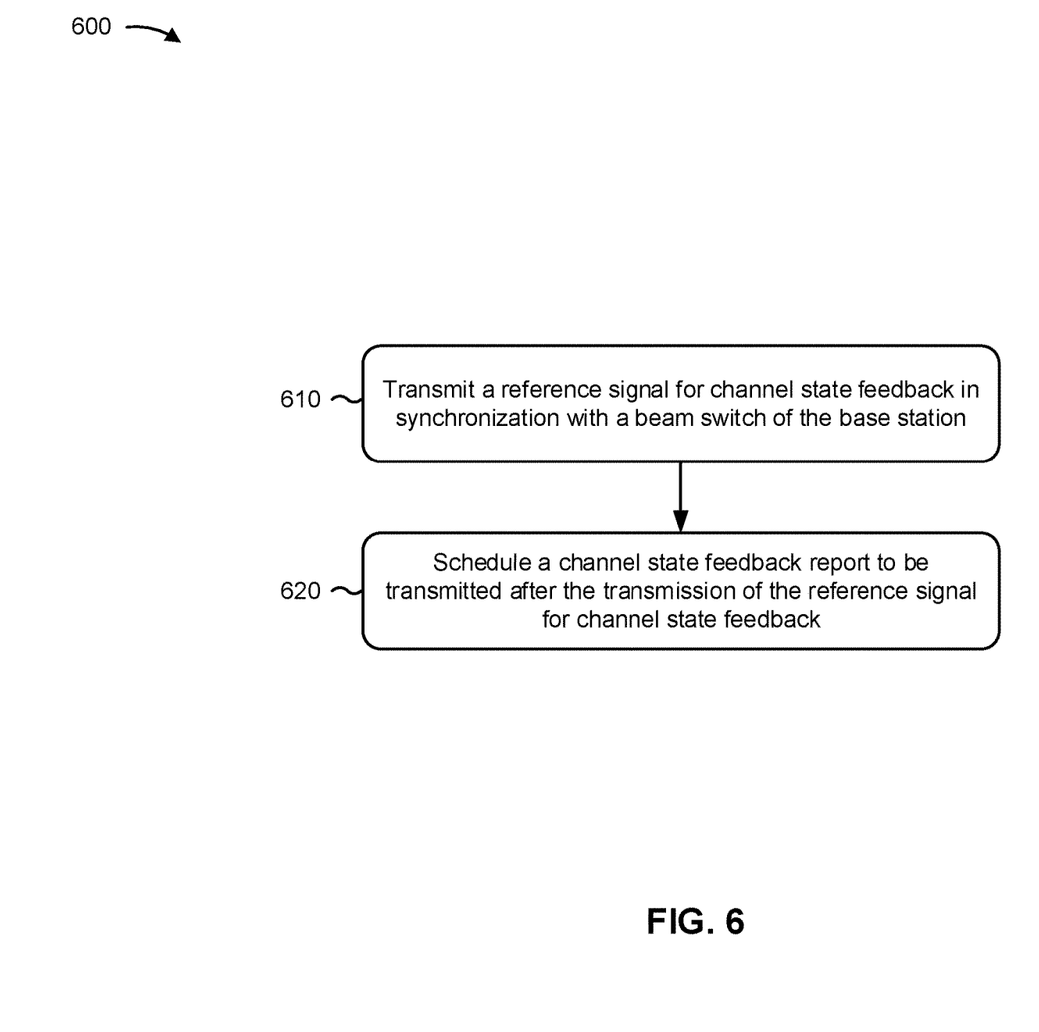
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110 and/or the like) performs operations associated with synchronization of base station beam switching with channel feedback.

As shown in FIG. 6, in some aspects, process 600 may include transmitting a reference signal for channel state feedback in synchronization with a beam switch of the base station (block 610). For example, the base station (e.g., using controller/processor 240, transmit processor 220, TX MIMO processor 230, MOD 232, antenna 234, and/or the like) may transmit a reference signal for channel state feedback in synchronization with a beam switch of the base station, as described above.

As further shown in FIG. 6, in some aspects, process 600 may include scheduling a channel state feedback report to be transmitted after the transmission of the reference signal for channel state feedback (block 620). For example, the base station (e.g., using transmit processor 220, receive processor 238, controller/processor 240, memory 242, and/or the like) may schedule a channel state feedback report to be transmitted after the transmission of the reference signal for channel state feedback, as described above.

Process 600 may include additional aspects, such as any single aspect or any combination of aspects described below and/or in connection with one or more other processes described elsewhere herein.

In a first aspect, the reference signal for channel state feedback is transmitted within 1 slot of the beam switch.

In a second aspect, alone or in combination with the first aspect, process 600 includes transmitting the reference signal for channel state feedback in a next available resource after the beam switch.

In a third aspect, alone or in combination with one or more of the first through second aspects, the reference signal for channel state feedback is received within a time window of the beam switch of the base station.

In a fourth aspect, alone or in combination with one or more of the first and third aspects, the time window is 2 ms.

In a fifth aspect, alone or in combination with one or more of the first through fourth aspects, the time window is 5 ms.

In a sixth aspect, alone or in combination with one or more of the first through fifth aspects, process 600 includes scheduling the channel state feedback report to be transmitted in a next available resource after the transmission of the reference signal for channel state feedback.

In a seventh aspect, alone or in combination with one or more of the first through sixth aspects, process 600 includes scheduling the channel state feedback report to be transmitted within a time period after the transmission of the reference signal for channel state feedback.

In an eighth aspect, alone or in combination with one or more of the first through seventh aspects, process 600 includes transmitting the reference signal for channel state feedback within a same slot as the beam switch of the base station.

In a ninth aspect, alone or in combination with one or more of the first through eighth aspects, process 600 includes receiving the channel state feedback report from the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station, comprising:
   synchronizing a beam switch of the base station with transmission of a reference signal for channel state feedback to a user equipment (UE) by scheduling the transmission of the reference signal for channel state feedback to the UE to be within a threshold number of slots of the beam switch of the base station;
   providing, to the UE, scheduling information for a channel state feedback report to be received, from the UE, within a time window after the transmission of the reference signal for channel state feedback to the UE; and
   receiving, from the UE, the channel state feedback report within the time window after the transmission of the reference signal for channel state feedback to the UE.

2. The method of claim 1, wherein the threshold number of slots is 1 slot.

3. The method of claim 1, wherein synchronizing the beam switch of the base station with the transmission of the reference signal for channel state feedback to the UE comprises:
   scheduling the reference signal for channel state feedback within a time window of the beam switch of the base station.

4. The method of claim 3, wherein the time window of the beam switch of the base station is 2 ms.

5. The method of claim 3, wherein the time window of the beam switch of the base station is 5 ms.

6. The method of claim 1, wherein synchronizing the beam switch of the base station with the transmission of the reference signal for channel state feedback to the UE comprises:
   scheduling the reference signal for channel state feedback in a next available resource after the beam switch.

7. The method of claim 1, wherein synchronizing the beam switch of the base station with the transmission of the reference signal for channel state feedback to the UE comprises:
   scheduling the reference signal for channel state feedback in a same slot as or a next slot after the beam switch of the base station.

8. The method of claim 1, wherein providing the scheduling information for the channel state feedback report comprises:

providing the scheduling information for the channel state feedback report to be received, from the UE, in a next available resource after the transmission of the reference signal for channel state feedback to the UE.

9. A method of wireless communication performed by a user equipment (UE), comprising:
   receiving, from a base station, a reference signal for channel state feedback that is synchronized with a beam switch of the base station by being received within a threshold number of slots of the beam switch of the base station;
   receiving, from the base station, scheduling information for a channel state feedback report to be transmitted within a time window after receiving the reference signal for channel state feedback; and
   transmitting, to the base station, the channel state feedback report within the time window after receiving the reference signal for channel state feedback.

10. The method of claim 9, wherein the threshold number of slots is 1 slot.

11. The method of claim 9, wherein the threshold number of slots is 2 slots.

12. The method of claim 9, wherein the reference signal for channel state feedback is received within a time window of the beam switch of the base station.

13. The method of claim 11, wherein the time window of the beam switch of the base station is 2 ms.

14. The method of claim 11, wherein the time window of the beam switch of the base station is 5 ms.

15. The method of claim 9, wherein the reference signal for channel state feedback is received in a same slot as or a next slot after the beam switch of the base station.

16. The method of claim 9, wherein the channel state feedback report is transmitted in a next available resource after receiving of the reference signal for channel state feedback.

17. A base station for wireless communication, comprising:
   a memory; and
   one or more processors coupled to the memory, the memory and the one or more processors configured to:
      transmit a reference signal for channel state feedback to a user equipment (UE) in synchronization with a beam switch of the base station by scheduling the transmission of the reference signal for channel state feedback to the UE to be within a threshold number of slots of the beam switch of the base station;
      provide, to the UE, scheduling information for a channel state feedback report to be received, from the UE, within a time window after the transmission of the reference signal for channel state feedback to the UE; and
      receive, from the UE, the channel state feedback report within the time window after the transmission of the reference signal for channel state feedback to the UE.

18. The base station of claim 17, wherein the reference signal for channel state feedback is transmitted within 1 slot of the beam switch.

19. The base station of claim 17, wherein the one or more processors, when transmitting the reference signal for channel state feedback to the UE in synchronization with the beam switch of the base station, are configured to:
   transmit the reference signal for channel state feedback to the UE in a next available resource after the beam switch of the base station.

20. The base station of claim 17, wherein the reference signal for channel state feedback is transmitted within a time window of the beam switch of the base station.

21. The base station of claim 20, wherein the time window of the beam switch of the base station is 2 ms.

22. The base station of claim 17, wherein the one or more processors, when providing the scheduling information for the channel state feedback report, are configured to:
   provide the scheduling information for the channel state feedback report to be received, from the UE, in a next available resource after the transmission of the reference signal for channel state feedback to the UE.

23. The base station of claim 17, wherein the one or more processors, when transmitting the reference signal for channel state feedback to the UE, are configured to:
   transmit the reference signal for channel state feedback to the UE within a same slot as the beam switch of the base station.

24. The base station of claim 17, wherein the one or more processors, when providing the scheduling information for the channel state feedback report, are configured to:
   provide the scheduling information for the channel state feedback report before the beam switch of the base station.

25. An apparatus, comprising:
   means for transmitting a reference signal for channel state feedback to a user equipment (UE) in synchronization with a beam switch of the apparatus by scheduling the transmission of the reference signal for channel state feedback to the UE to be within a threshold number of slots of the beam switch of the apparatus;
   means for providing scheduling information for a channel state feedback report to be received, from the UE, within a time window after transmitting the reference signal for channel state feedback to the UE; and
   means for receiving, from the UE, the channel state feedback report within the time window after the transmission of the reference signal for channel state feedback to the UE.

26. The apparatus of claim 25, wherein the reference signal for channel state feedback is transmitted within 1 slot of the beam switch.

27. The apparatus of claim 25, wherein the means for transmitting the reference signal for channel state feedback to the UE in synchronization with the beam switch of the apparatus comprises:
   means for transmitting the reference signal for channel state feedback to the UE in a next available resource after the beam switch of the apparatus.

28. The apparatus of claim 25, wherein the reference signal for channel state feedback is transmitted within a time window of the beam switch of the apparatus.

29. The apparatus of claim 28, wherein the time window of the beam switch of the apparatus is 2 ms.

30. The apparatus of claim 25, wherein the means for providing the scheduling information for the channel state feedback report comprises:
   means for providing the scheduling information for the channel state feedback report to be received, from the UE, in a next available resource after the transmission of the reference signal for channel state feedback to the UE.

* * * * *